United States Patent
Bedekar et al.

(10) Patent No.: US 8,045,504 B2
(45) Date of Patent: Oct. 25, 2011

(54) METHOD AND APPARATUS FOR FACILITATING NETWORK MOBILITY

(75) Inventors: Anand S. Bedekar, Arlington Heights, IL (US); James A. Butler, Bartlett, IL (US); Paul M. Erickson, Palatine, IL (US); Steven D. Upp, Bartlett, IL (US); Narayanan Venkitaraman, Palatine, IL (US); Paula Tjandra, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 633 days.

(21) Appl. No.: 11/616,040

(22) Filed: Dec. 26, 2006

(65) Prior Publication Data

US 2008/0151815 A1 Jun. 26, 2008

(51) Int. Cl.
*H04W 4/00* (2009.01)
(52) U.S. Cl. ......... 370/328; 370/338; 370/331; 370/466
(58) Field of Classification Search ............ 455/436; 370/331, 466, 328, 338
See application file for complete search history.

(56) References Cited

U.S. PATENT DOCUMENTS

| 6,721,297 | B2* | 4/2004 | Korus et al. ............ 370/338 |
| 6,980,802 | B2* | 12/2005 | Jung ............ 455/436 |
| 2002/0064149 | A1 | 5/2002 | Elliott et al. |
| 2004/0018829 | A1 | 1/2004 | Raman et al. |
| 2004/0156346 | A1* | 8/2004 | O'Neill ............ 370/338 |
| 2005/0198374 | A1 | 9/2005 | Suzuki |
| 2005/0276247 | A1* | 12/2005 | Heiman et al. ............ 370/331 |
| 2006/0251115 | A1* | 11/2006 | Haque et al. ............ 370/466 |

FOREIGN PATENT DOCUMENTS

| EP | 1513365 A2 | 3/2005 |
| EP | 1653680 A2 | 5/2006 |

OTHER PUBLICATIONS

Narten, T. et al.: "Neighbor Discovery for IP Version 6 (IPv6)", Network Working Group, Request for Comments: 2461, Obsoletes, 1970, Category: Standards Track, The Internet Society, Dec. 1998, pp. 13, 64-65, 77.

(Continued)

*Primary Examiner* — David Q Nguyen (57) ABSTRACT

Various embodiments are described for facilitating network mobility in communication networks with an aim toward enhancing the scalability of MIP. Generally, in most of these embodiments, a network node (121) sends a message to a network device (131) to establish a data path for a remote unit (101) served by the network node. This message comprises a source link layer address which is associated with the remote unit. The message may or may not be sent in response to receiving signaling to facilitate wireless connectivity of a remote unit via the network node. In addition, the network device to which the message is sent may be an access router (AR) or a foreign agent (FA) of the remote unit.

17 Claims, 4 Drawing Sheets

OTHER PUBLICATIONS

Perkins, Ed., C.: "IP Mobility Support for IPv4", Network Working Group, Request for Comments: 3344, Obsoletes: 3220, The Internet Society, Aug. 2002, p. 5.

Johnson, D. et al.: "Mobility Support in IPv6", Network Working Group, Request for Comments: 3775, The Internet Society, Jun. 2004, p. 6.

Koodli, Ed., R.: "Fast Handovers for Mobile IPv6", Network Working Group, Request for Comments 4068, Category: Experimental, The Internet Society, Jul. 2005, p. 3.

Soliman, H. et al.: "Hierarchial Mobile IPv6 Mobility Management (HMIPv6)", Network Working Group, Request for Comments: 4140, Category: Experimental, The Internet Society, Aug. 2005, p. 3-4.

Handley, Ed., M. et al.: "Internet Denial-of-Service Considerations", Network Working Group, Request for Comments: 4732, Category: Informational, The IETF Trust, Nov. 2006, p. 13.

Handley, Ed., M. et al.: "Internet Denial-of-Service Considerations", draft-iab-dos-05.txt, Network Working Group, Internet-Draft, The Internet Society, Expires: Jan. 21, 2007, pp. 1-42.

* cited by examiner

METHOD AND APPARATUS FOR FACILITATING NETWORK MOBILITY

FIELD OF THE INVENTION

The present invention relates generally to communication systems and, in particular, to facilitating network mobility in communication networks.

BACKGROUND OF THE INVENTION

The use of mobile internet protocol (MIP) in the design of present and future wireless communication systems is becoming more prevalent. Thus, devices and/or techniques that enhance the scalability of MIP are both useful and desirable. For example, in networks where APs/BSs (access points/base stations) are connected by a switched Ethernet to a MIP foreign agent (FA), current techniques involve the sending of a MIP registration request to the home agent (HA) each time a mobile moves between BS/APs, even when it is between BS/APs on the same switched Ethernet under the same FA. In addition, to perform data path redirection in this manner, mobiles need to be MIP-capable, Ethernet-capable and/or address resolution protocol (ARP)-capable. This may also lead to excessive signaling from mobiles over the wireless interface to the APs/BSs and increase the latency of the data path redirection. Limitations, such as these and others, limit the extent to which network designers can extend the use of MIP in communication systems.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams above are described and shown with reference to specific signaling exchanged in a specific order, some of the signaling may be omitted or some of the signaling may be combined, sub-divided, or reordered without departing from the scope of the claims. Thus, unless specifically indicated, the order and grouping of the signaling depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described for facilitating network mobility in communication networks with an aim toward enhancing the scalability of MIP. Generally, in most of these embodiments, a network node sends a message to a network device to establish a data path for a remote unit served by the network node. This message comprises a source link layer address which is associated with the remote unit. The message may or may not be sent in response to receiving signaling to facilitate wireless connectivity of a remote unit via the network node. In addition, the network device to which the message is sent may be an access router (AR) or a foreign agent (FA) of the remote unit.

Figure 1:
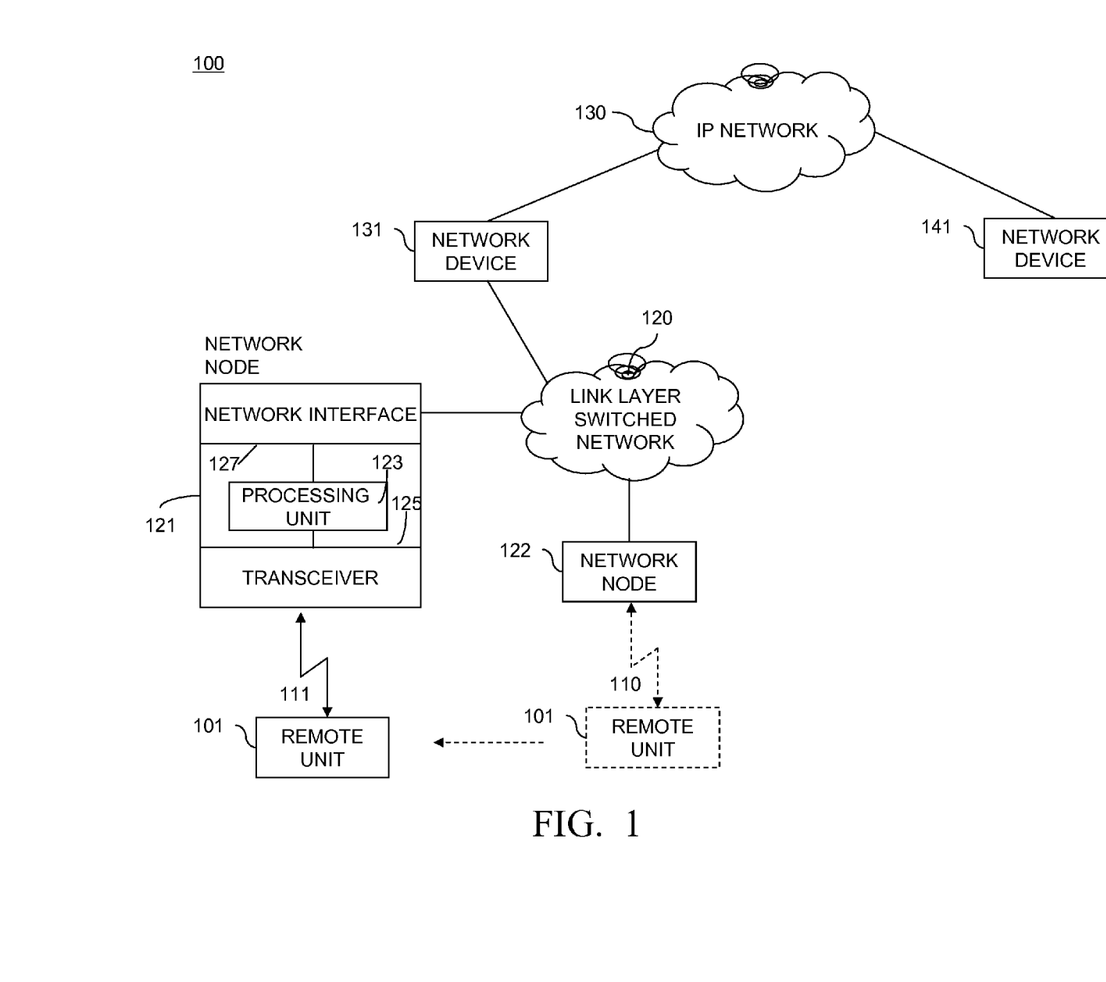
FIG. 1 is a block diagram depiction of a wireless communication system in accordance with multiple embodiments of the present invention.

The disclosed embodiments can be more fully understood with reference to FIGS. 1-4. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for wireless telecommunications systems. (These groups may be contacted via http://www.openmobilealliance.com, http://www.3qpp.orq/, http://www.3gpp2.com/, http://www.ieee802.orq/, and http://www.wimaxforum.org/ respectively.) Communication system 100 represents a system having an architecture in accordance with one or more of the WiMAX Forum and/or IEEE 802 technologies, suitably modified to implement the present invention. Alternative embodiments of the present invention may be implemented in communication systems that employ other or additional technologies such as, but not limited to, those described in the OMA, 3GPP, and/or 3GPP2 specifications.

Communication system 100 is depicted in a very generalized manner. In particular, network node 121 is shown communicating via wireless interface 111 with remote unit 101, while network node 122 is shown having previously communicated via wireless interface 110 with remote unit 101. Both wireless interfaces 110 and 111 are in accordance with the particular access technology supported by each respective network node. For example, they may both utilize the same technology such as one based on IEEE 802.16, or they may utilize two different access technologies. Those skilled in the art will recognize that FIG. 1 does not depict all of the physical fixed network components that may be necessary for system 100 to operate but only those system components and logical entities particularly relevant to the description of embodiments herein.

For example, FIG. 1 depicts network node 121 as comprising processing unit 123, transceiver 125 and network interface 127. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, device 121 represents a known device that has been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more RAN components, such as a base transceiver station (BTS) and/or a base station controller (BSC), a Node-B and/or a radio network controller (RNC), or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station.

Remote unit 101 and network node 121 is shown communicating via a technology-dependent, wireless interface. Remote units, subscriber stations (SSs) or user equipment (UEs), may be thought of as mobile stations (MSs), mobile subscriber stations (MSSs) or mobile nodes (MNs). In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote unit 101 comprises a processing unit (not shown) and transceiver (not shown). Depending on the embodiment, remote unit 101 may additionally comprise a keypad (not shown), a speaker (not shown), a microphone (not shown), and a display (not shown). Processing units, transceivers, keypads, speakers, microphones, and displays as used in remote units are all well-known in the art.

Figure 2:
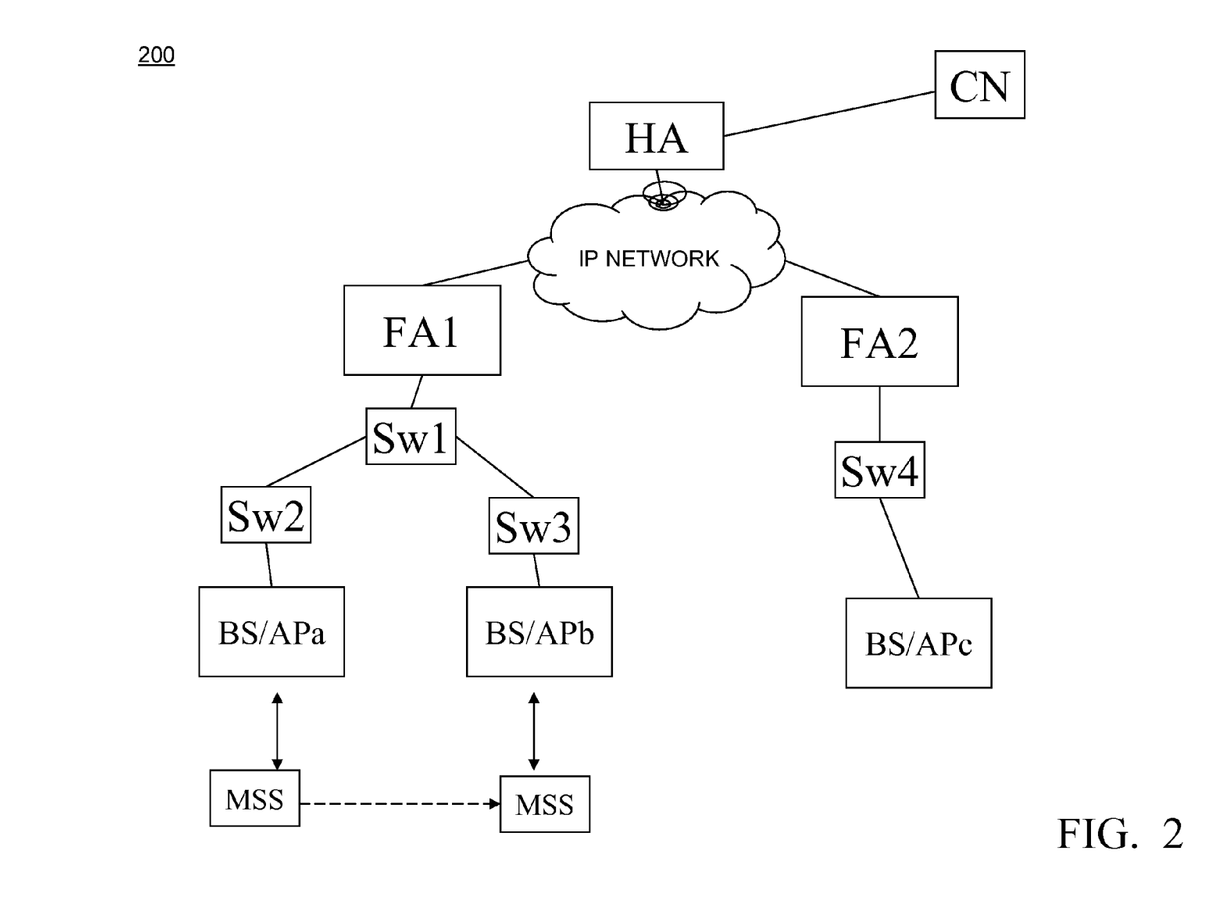
FIG. 2 is a block diagram depiction of a wireless communication system in accordance with various IPv4 (Internet Protocol Version 4) embodiments of the present invention.
Figure 4:
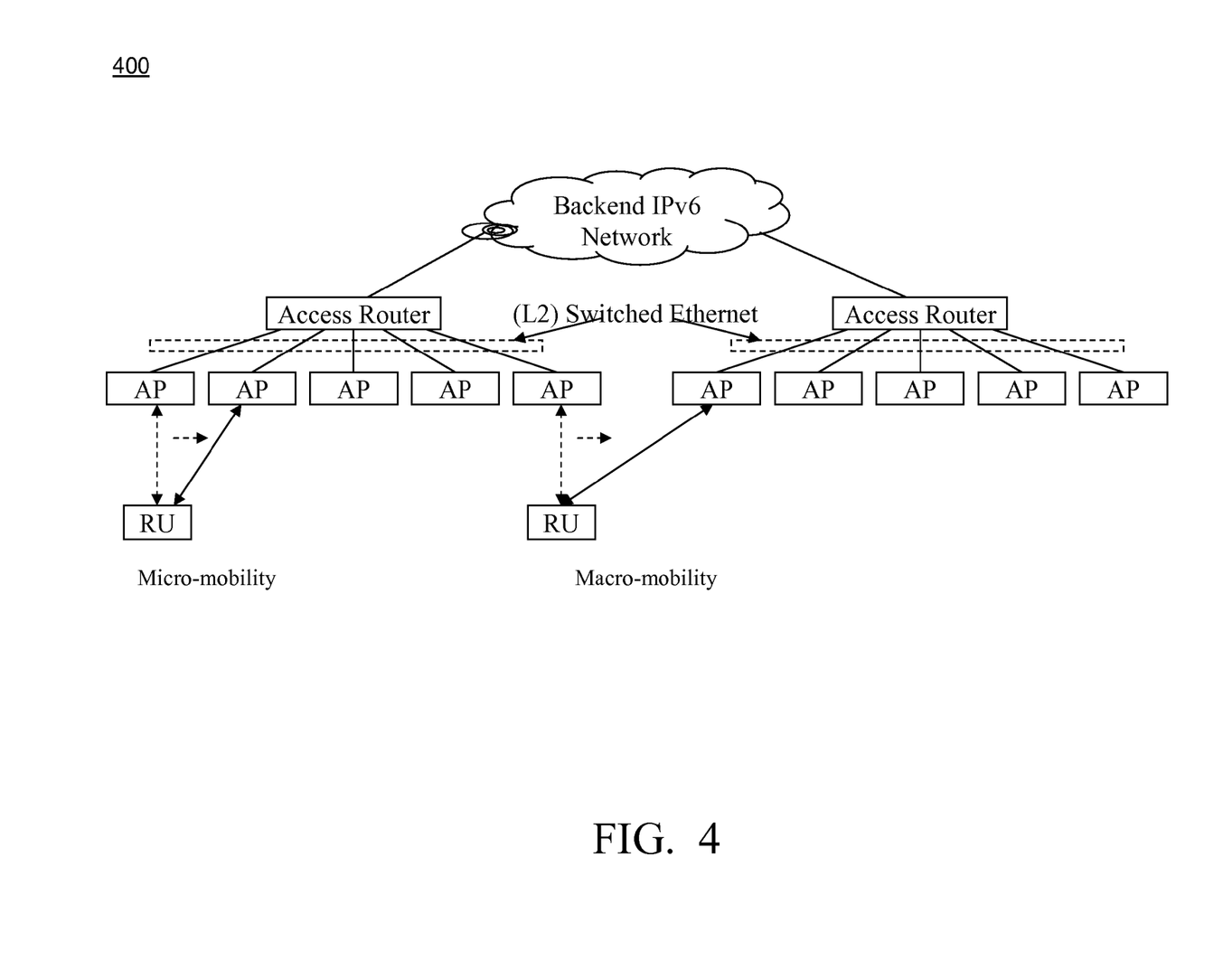
FIG. 4 is a block diagram depiction of a wireless communication system in accordance with various IPv6 (Internet Protocol Version 6) embodiments of the present invention.

FIG. 2 is a block diagram depiction of a wireless communication system 200 in accordance with various IPv4 embodiments of the present invention, while FIG. 4 is a block diagram depiction of a wireless communication system 400 in accordance with various IPv6 embodiments of the present invention. The components of systems 200 and 400 can be mapped to the more generally depicted components of system 100 to provide some more specific examples of the type of systems that are encompassed by the FIG. 1 depiction.

For example, the MSS and the BS/APa and BS/APb of system 200 correspond respectively to remote unit 101 and network nodes 121 and 122, while Sw1, Sw2 and Sw3 (representing Ethernet switches) correspond to elements within the link layer switched network 120. In addition, FA1 (foreign agent 1) and HA (home agent) can correspond to network devices 131 and 141. To provide some additional context, FIG. 2 also depicts a correspondent node (CN) which is engaged in communications with the MSS, and an FA2, an Sw4 and a BS/APc to show a neighboring network under a different foreign agent (i.e., under FA2 instead of FA1). In this context, the term micro-mobility may be used to refer to the mobility of an MSS from one BS/AP to another BS/AP under the same foreign agent, whereas the term macro-mobility may be used to refer to the mobility of an MSS from one BS/AP to another BS/AP under a different foreign agent.

FIG. 4 also provides some context by depicting two different networks connected to the backend IPv6 network via two different access routers (ARs). Either AR may be mapped to network device 131, and any AP under that AR may be mapped to network node 121. In addition, the (L2, i.e., Layer 2 or link layer) Switched Ethernet under that AR may be mapped to network 120, and either RU may be mapped to remote unit 101. In the context of FIG. 4, the term micro-mobility refers to mobility wherein an RU hands over to another AP served by the same AR, whereas macro-mobility refers to mobility wherein an RU hands over to another AP served by a different AR.

Operation of embodiments in accordance with the present invention occurs substantially as follows, first with reference to FIG. 1. Processing unit 123 of network node 121 sends a message to network device 131, via network interface 127, to establish a data path through network 120 for remote unit 101 which is served by network node 121 via transceiver 125. This message includes a source link layer address which is associated with the remote unit. Alternatively, this link layer address may not be used as the source address of the message, but contained in another field of the message. Depending on the embodiment, this link layer address may be a MAC (medium access control) address, an Ethernet address, a WiMAX (Worldwide Interoperability for Microwave Access) address, an IEEE 802.16 address, an IMSI (International Mobile Subscriber Identity)-based address, or a TMSI (Temporary Mobile Subscriber identity)-based address. Also, depending on the embodiment, this address may be remote unit 101's address or an address that processing unit 123 creates for remote unit 101.

The message is sent to network device 131 which may provide various services to network node 121 and remote unit 101 depending on the embodiment. For example, in the embodiments depicted by FIG. 1, network node 121 obtains access to IP network 130 via network device 131. Thus, network device 131 may serve network node 121 and remote unit 101 as a device such as an access router (AR) or a foreign agent (FA).

Depending on the particular embodiment, this message may take various forms. For example, the message may be of any one of the following message types: an agent solicitation, mobile internet protocol (MIP) registration request, an address resolution protocol (ARP) message, a router solicitation message, an unsolicited neighbor advertisement message, a neighbor solicitation message, or an LLC XID (link layer control exchange identifier) message. Also, the message may be sent to update information used by link layer forwarding units (e.g., link layer switches) in network 120 for forwarding packets to the remote unit. In one example, the source link layer address information in the message is used by the forwarding units in network 120 to update their forwarding table entries for that address. In another example, an unsolicited neighbor advertisement message may be sent with an override flag that is set to indicate that existing cache entries should be overridden. Thus, the message may be sent to establish (i.e., to either set up or redirect) the data path for remote unit 101.

When the message is sent also varies depending on the embodiment. For example, the message may be sent in response to signaling that the network node receives (via either network interface 127 or transceiver 125) to facilitate the wireless connectivity of remote unit 101 via network node 121. This received signaling may be to facilitate the network entry of remote unit 101, the handover of remote unit 101 to network node 121, or routing discovery for remote unit 101. Examples of the signaling that may be received then include network entry signaling from the remote unit, handover signaling from the remote unit (which may include context transfer signaling from another network node such as the handover-source node), location area update signaling from the remote unit, paging area update signaling from the remote unit, and Cryptographically Generated Address (CGA) information associated with the source link layer address. Thus, the signaling whose receipt may trigger the message being sent can take many different forms and be received from various entities in many different situations. Further, the timing at which the message is sent in relation to the timing of receiving the signaling may vary in different circumstances. In one example, the message is sent after receiving the signaling but prior to the actual establishment of the wireless connectivity of remote unit 101 via network node 121.

To summarize then, in most of these embodiments, the network node sends a message to the network device to establish a data path for the remote unit served by the network node. This network device may be an access router (AR) or a foreign agent (FA) of the remote unit in some embodiments. The message that is sent comprises a source link layer address which is associated with the remote unit, and the message may or may not be sent in response to receiving other signaling, such as signaling to facilitate wireless connectivity of the remote unit via the network node.

Figure 3:
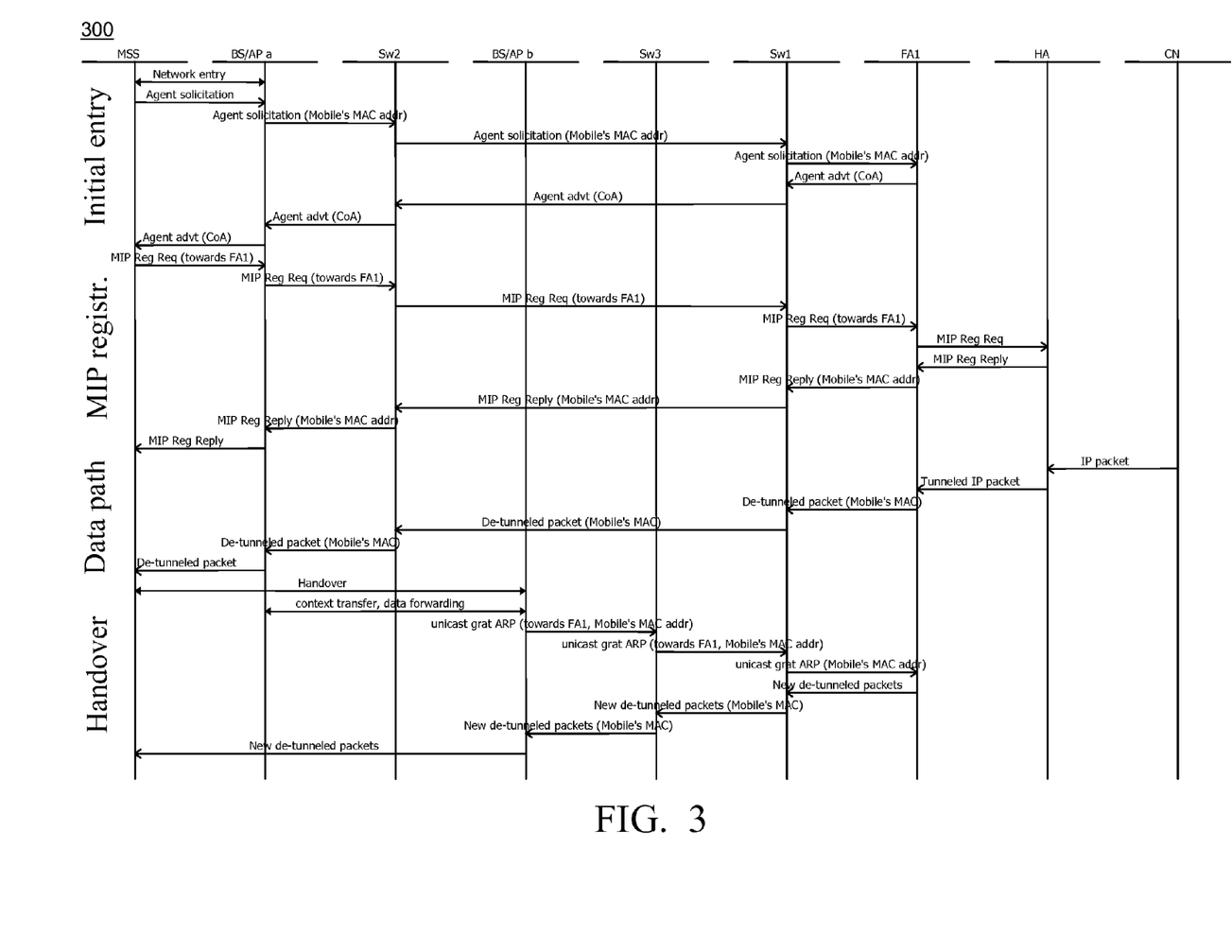
FIG. 3 is a signaling flow diagram that depicts examples of signaling related to initial network entry, MIP registration, the receipt of data, and handover, in accordance with various IPv4 embodiments of the present invention.

FIG. 3 is a signaling flow diagram 300 that depicts examples of signaling related to initial network entry, MIP registration, the receipt of data, and handover, in accordance with various IPv4 embodiments of the present invention. The following is a detailed description with reference to the signaling flow that provides a number of specific signaling and system architecture details as a means to further describe particular, and quite specific, embodiments of the present invention. It is intended to further the reader's understanding of embodiments rather than to limit the scope of the invention.

As depicted in FIG. 2, the BS/APs are connected to the FAs by switched Ethernet networks. The MSS may be an 802.16e mobile that uses either an IP convergence sublayer or an Ethernet convergence sublayer. The mobile may be MIP capable (e.g., able to register with an FA). If the mobile is not MIP capable, the serving BS/AP can register with the FA (as a proxy MIP client) on the mobile's behalf. Furthermore, the mobile may have an Ethernet-compatible MAC (medium access control) address (such as in the case of an 802.16e mobile), but if not (such as in the case of a High Speed Downlink Packet Access (HSDPA) mobile), the BS/AP can create a unique identifier for the mobile to use. Whether created for the mobile or not, this address will be referred to in the following description simply as the mobile's MAC address.

When a mobile first connects to a BS/AP on a switched Ethernet subnet with an FA, the BS/AP sends or forwards from the mobile a MIP registration request to the FA in an Ethernet frame using a source MAC address (S-MAC) that is unique to the mobile (either mobile's own MAC address or a created address). This should cause the FA's visitor entry map link-layer address for the mobile to become S-MAC.

In accordance with signaling flow diagram 300, the mobile initially connects to BS/APa, solicits and then receives an agent advertisement from FA1. The mobile sends a MIP registration request to the HA through FA1. Alternatively, the BS/APa could send the MIP registration request by proxy to FA1, if, for example, the mobile is not MIP capable. Thus, there are at least two cases: the client-MIP case, in which the mobile sends a MIP registration request towards the FA and the BS/AP forwards the MIP registration request in an Ethernet frame using S-MAC as source Ethernet address; and the proxy-MIP case, in which the BS/AP can send out a MIP registration request on mobile's behalf (esp. if mobile is not MIP-capable) in an Ethernet frame using S-MAC as the source Ethernet address. Only the client-MIP case is illustrated in FIG. 3. FA1 can thereby maintain a visitor's entry list binding the mobile's home IP address to the mobile's MAC address. Further, the use of S-MAC as the source Ethernet address has the effect of updating the forwarding tables of the Ethernet switches along the path from BS/APa to FA1. Consequently, in this example, subsequent data packets targeted to S-MAC will be forwarded by these switches towards BS/APa.

FAs maintain visitor lists that include the home IP address and link layer address of each registered mobile, in accordance with IETF (Internet Engineering Task Force) RFC 3344. An FA forwards packets received through the tunnel from the HA to a mobile using the link layer address in its visitor list for that mobile. ARP is typically not used for this link layer address; the binding in the visitor entry list is used. Generally, ARPs or grat ARPs received on the FA's network interfaces do not modify the information in the FA's visitor entry list, although specific FA implementations may differ.

Packets coming from the HA to FA1 are de-tunneled and sent to the mobile's MAC address through Sw1 and Sw2 to BS/APa. The BS monitors and picks up all incoming packets with a destination Ethernet address corresponding to the S-MAC of any mobile that it is currently serving. This mode of operation of the BS with respect to incoming packets on its network interface is typically referred to as promiscuous mode. Due to the fact that the forwarding tables of the Ethernet switches have been suitably updated, a BS should not receive any spurious packets on its Ethernet interface unless there is a broadcast segment in the Ethernet.

On handover, the old BS/AP and the new BS/AP can do a context transfer as well as data forwarding from the old BS/AP to the new BS/AP. The context should include the S-MAC (especially if it was created for the mobile) and a home IP address, any keys, etc. (if proxy MIP is being used). The context may also include FA parameters such as a CoA (care of address). Including the FA parameters is particularly useful when there are multiple FAs on the same switched Ethernet and one of them was used for registration.

In accordance with signaling flow diagram 300, the mobile moves from BS/APa to BS/APb under FA1's switched Ethernet. The mobile gets the same agent advertisement so it does not do a MIP update. The BS/APb itself may send the agent advertisement to reduce latency. BS/APb sends out a unicast grat ARP towards FA1 using the mobile's MAC address as source address. This updates the forwarding tables at all Ethernet switches along the path to FA1; the rest of the switches are not updated. FA1's visitor entry list is also not updated. FA1 will continue de-tunneling incoming packets, looking up the visitor entry list, and forwarding to the mobile's MAC address. Now packets follow the new path, FA1→Sw1→Sw3→BS/APb→mobile.

If the mobile moves to BS/APc under FA2, the new MIP registration request is sent to the HA through FA2 (either by the mobile after giving it an agent advertisement or by BS/APc acting as a proxy). The switches under the new FA (Sw4 under FA2, e.g.) are then updated using either the MIP registration request itself or additional unicast grat ARPs.

Individual embodiments such as those described above with respect to FIGS. 2 and 3 can exhibit at least some of the following benefits. For example, if the Ethernet segment is large (i.e., having many base stations), multiple FAs may be used. (The BS can "proxy" agent advts. to the mobile and can load-balance between FAs.) Scalability for Mobile IP may be provided without requiring an additional level of tunneling. Standard IP mobiles may be used, even if they don't implement Mobile IP. And a variety of air-interface technologies (such as 802.16, 1× EV/DO (High Rate Packet Data), UMTS, etc.) may be used.

FIG. 4 is a block diagram depiction of a wireless communication system in accordance with various IPv6 embodiments of the present invention. The following is a detailed description with reference to diagram 400 that provides a number of specific signaling and system architecture details as a means to further describe particular, and quite specific, embodiments of the present invention. It is intended to further the reader's understanding of embodiments rather than to limit the scope of the invention.

When a mobile first connects (i.e., performs a network entry procedure) to an AP, a (Proxy) Router Solicitation is sent by the AP to the applicable Access Router; the source link layer address is set to a MAC address that is unique to the mobile (either the mobile's MAC address or an address created for the mobile). (This router solicitation could be also be sent out by the mobile per IETF RFC 2461.) If there is no existing Neighbor Cache entry for the solicitation sender, the Access Router creates a Neighbor Cache Entry for the mobile and installs the link-layer address. If there is an existing Neighbor Cache entry for the solicitation sender and the received link-layer address differs from that already in the cache, the Access Router updates the link-layer address in the appropriate Neighbor Cache Entry.

The APs run in promiscuous mode, receiving all the frames from the L2 network destined for themselves or for MAC addresses of any mobiles they serve. When a mobile moves between APs on the same switched Ethernet network (i.e., the micro-mobility case) a (Proxy) Neighbor Advertisement is sent out to the Access Router. The source link layer address is set to a MAC address that is unique to the mobile (either the mobile's MAC address or the created address). This will update the Ethernet forwarding entries in the Ethernet switches between the AP and the Access Router. Also, the "O (Override)" flag is set to indicate that the advertisement should override an existing cache entry and update the cached link-layer address.

When a mobile instead moves between APs under two different switched Ethernet networks (i.e., the macro-mobility case), a Router Solicitation is sent out to the Access Router by the new AP, the source link layer address is set to a MAC address that is unique to the mobile (either the mobile's MAC address or the created address). This router solicitation could alternatively be sent out by the mobile per IETF RFC 2461.

If Secure Neighbor Discovery (SEND) protocol (IETF RFC 3971) is implemented, a Cryptographically Generated Address (CGA) is used to make sure that the sender of a Neighbor Discovery message is the "owner" of the claimed address. The new AP will need the public/private key pair and other information related to CGA (such as collision count). The CGA information could be provided to the AP through signaling, either by the mobile (as part of the handover signaling, e.g.), or by a AAA server as part of the access network authentication process, and/or by an authenticator function if it exists in the network. In addition, the authenticator function could provide the Neighbor Solicitation function for the mobile.

One of skill in the art will appreciate that various modifications and changes may be made to the specific embodiments described above with respect to FIGS. 2-4 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for facilitating network mobility comprising:
   receiving, by a network node, signaling to facilitate wireless connectivity of a remote unit via the network node wherein the network node is coupled to a link layer switched network;
   sending a message by the network node via the link layer switched network to one of a plurality of network devices coupled to the link layer switched network, in response to receiving the signaling,
   wherein the message is a link layer message and comprises a source link layer address that is uniquely associated with the remote unit and wherein the message establishing a data path associated with the remote unit, and wherein the data path being between the network node and the network device for enabling data from the network device destined for the remote unit through the network node.

2. The method of claim 1, wherein the source link layer address comprises at least one of a MAC (medium access control) address, an Ethernet address, a WiMAX (Worldwide Interoperability for Microwave Access) address, an IEEE 802.16 address, an IMSI (International Mobile Subscriber Identity)-based address, and a TMSI (Temporary Mobile Subscriber identity)-based address.

3. The method of claim 1, wherein the source link layer address is unique to the remote unit with respect to the network device.

4. The method of claim 1, wherein the message comprises one of a
a mobile internet protocol (MIP) agent solicitation,
MIP registration request,
an address resolution protocol (ARP) message,
a router solicitation message,
an neighbor advertisement message,
a neighbor solicitation message, and
link layer control exchange identifier (LLC XID) message.

5. The method of claim 4, wherein the neighbor advertisement message comprises an override flag that is set to indicate that an existing cache entry is to be overridden.

6. The method of claim 1, wherein the message is sent to update information used by link layer switched network in forwarding packets to the address which is associated with the remote unit.

7. The method of claim 1, wherein the message is sent by the network node prior to completing establishment of wireless connectivity with the remote unit.

8. The method of claim 1, further comprising
receiving, by the network node via the network device, messages targeting the remote unit.

9. The method of claim 1, wherein the signaling received facilitates at least one of:
network entry of the remote unit via the network node,
handover of the remote unit to the network node, and
routing discovery for the remote unit.

10. The method of claim 1, wherein the signaling received comprises at least one of
network entry signaling from the remote unit,
handover signaling from the remote unit,
handover indication signaling from a handover-source network node,
location area update signaling from the remote unit,
paging area update signaling from the remote unit, and
Cryptographically Generated Address (CGA) information associated with the source link layer address.

11. The method of claim 10, wherein the handover indication signaling comprises context transfer signaling from a handover-source network node.

12. The method of claim 1, wherein the signaling received identifies at least one of
the network device that corresponds to a foreign agent (FA) of the remote unit and
the source link layer address which is associated with the remote unit.

13. A method for facilitating network mobility comprising:
sending a message by a network node via a link layer switched network to one of a plurality of network devices coupled to the link layer switched network to establish a data path for a remote unit served by the network node,
wherein the message is a link layer message and comprises a source link layer address that is uniquely associated with the remote unit,
wherein the network device comprises one of an access router (AR) and a foreign agent (FA) of the remote unit, and
wherein the data path being between the network node and the network device for enabling data from the network device destined to the remote unit through the network node.

14. The method of claim 13, wherein sending the message to establish the data path for the remote unit comprises
sending the message to redirect the data path for the remote unit.

15. The method of claim 13, wherein the message comprises one of a
a mobile internet protocol (MIP) agent solicitation,
MIP registration request,
an address resolution protocol (ARP) message,
a router solicitation message,
an neighbor advertisement message,
a neighbor solicitation message, and
link layer control exchange identifier (LLC XID) message.

16. A network node comprising:
a transceiver;
a network interface; and
a processing unit, communicatively coupled to the transceiver and the network interface,
adapted to receive, via the transceiver, signaling to facilitate wireless connectivity of a remote unit via the network node wherein the network node is coupled to a link layer switched network,
adapted to send, via the network interface to the link layer switched network, a message to one of a plurality of network devices coupled to the link layer switched network in response to receiving the signaling,
wherein the message is a link layer message and comprises a source link layer address that is uniquely associated with the remote unit and wherein the message establishing a data path associated with the remote unit, and
wherein the data path being between the network node and the network device for enabling data from the network device destined for the remote unit through the network node.

17. A network node comprising:
a transceiver;
a network interface; and
a processing unit, communicatively coupled to the transceiver and the network interface, adapted to send, via the network interface, a message via a link layer switched network to one of a plurality of network devices coupled to the link layer switched network to establish a data path for a remote unit served by the network node via the transceiver,
wherein the message is a link layer message and comprises a source link layer address that is uniquely associated with the remote unit,
wherein the network device comprises one of an access router (AR) and a foreign agent (FA) of the remote unit, and
wherein the data path being between the network node and the network device for enabling data from the network device destined for the remote unit through the network node.

* * * * *